US011699149B2

(12) United States Patent
Karaivanov

(10) Patent No.: US 11,699,149 B2
(45) Date of Patent: *Jul. 11, 2023

(54) SYSTEMS AND METHODS FOR SUBSTITUTE LOW-VALUE TOKENS IN SECURE NETWORK TRANSACTIONS

(71) Applicant: Worldpay, LLC, Symmes Township, OH (US)

(72) Inventor: Stefan K. Karaivanov, Newton, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,124

(22) Filed: Dec. 17, 2021

(65) Prior Publication Data

US 2022/0108306 A1    Apr. 7, 2022

Related U.S. Application Data

(63) Continuation of application No. 16/717,620, filed on Dec. 17, 2019, now Pat. No. 11,238,446, which is a continuation of application No. 15/283,865, filed on Oct. 3, 2016, now Pat. No. 10,546,292.

(51) Int. Cl.
*G06Q 20/38* (2012.01)
*G06Q 20/40* (2012.01)

(52) U.S. Cl.
CPC ......... *G06Q 20/382* (2013.01); *G06Q 20/401* (2013.01)

(58) Field of Classification Search
CPC .................................................. G06Q 20/385
USPC .............................................. 705/65, 66, 75
See application file for complete search history.

(56) References Cited

U.S. PATENT DOCUMENTS

| 9,098,266 | B1* | 8/2015 | Zou ....................... G06F 15/167 |
| 9,652,769 | B1 | 5/2017 | Golin |
| 10,546,292 | B1* | 1/2020 | Karaivanov ......... G06Q 20/065 |
| 11,238,446 | B2* | 2/2022 | Karaivanov ......... G06Q 20/065 |
| 2012/0260322 | A1* | 10/2012 | Logan ..................... G06F 21/33 726/6 |
| 2016/0269391 | A1 | 9/2016 | Gaddam et al. |
| 2017/0278098 | A1 | 9/2017 | Castinado et al. |
| 2017/0337549 | A1 | 11/2017 | Wong |

* cited by examiner

*Primary Examiner* — Chinedu C Agwumezie
(74) *Attorney, Agent, or Firm* — Bookoff McAndrews, PLLC

(57) ABSTRACT

Methods and systems are disclosed for enabling the creation of substitute low-value token creation, comprising providing software content to a content delivery network wherein, when transmitted to a user browser, the software content is configured to enable the user browser to create a substitute low-value token if a token service is unavailable, wherein the content delivery network is configured to provide the software content to at least one user browser, and receiving the substitute low-value token from a merchant system, the substitute low-value token having been generated by the user browser in response to the user browser being unable to obtain a low-value token from the token service.

20 Claims, 5 Drawing Sheets

SYSTEMS AND METHODS FOR SUBSTITUTE LOW-VALUE TOKENS IN SECURE NETWORK TRANSACTIONS

CROSS-REFERENCE TO RELATED APPLICATION(S)

This patent application is a continuation of U.S. patent application Ser. No. 16/717,620, filed Dec. 17, 2019, which is a continuation of and claims the benefit of priority to U.S. patent application Ser. No. 15/283,865, filed Oct. 3, 2016, now U.S. Pat. No. 10,546,292, granted Jan. 28, 2020, the entireties of which are incorporated herein by reference.

FIELD OF DISCLOSURE

The present disclosure relates generally to the field of secure network transactions and, more particularly, to the creation of substitute low-value tokens in the event of a network outage.

BACKGROUND

One reality of the modern Internet-connected world is that the storage and transfer of sensitive and secure electronic data is potentially vulnerable to data breaches. Further, as electronic systems, such as electronic sales systems, become more complex, and as hackers become more sophisticated, security concerns are continually increasing.

In the early days of electronic transactions, dedicated magnetic card readers would scan unencrypted sensitive data on a credit card and transfer it to a transaction service for completion of the transaction. These communications were typically made over a dial-up connection and required basic encryption in the reader device in order to maintain security of the packet.

Over time, the reader devices have become more advanced, often with Internet connections and data input ports that enable malware to infect POS terminals. Further, as more and more merchants, such as online merchants, have moved to transfer data over the Internet, additional security features have been developed.

Most notably, "tokenization" is a means for replacing sensitive data with a "token" of data that may be non-decryptable or non-detokenizable by the merchant or other tokenization users (e.g., because they require third party decryption). Merchants, for example, might not ever store sensitive data themselves, thus enhancing data security.

However, a problem may arise if and when the token provider experiences a network outage. For example, an online merchant may be unable to obtain a token to perform an online transaction. A solution is needed that will preserve risk reduction, enable a cost-effective architecture, and that does not dilute the original value proposition.

SUMMARY

Included are embodiments of a computer-implemented method for tokenizing sensitive data. Some embodiments of a method comprise providing software content to a content delivery network wherein, when transmitted to a user browser, the software content is configured to enable the user browser to create a substitute low-value token if a token service is unavailable, wherein the content delivery network is configured to provide the software content to at least one user browser, and receiving the substitute low-value token from a merchant system, the substitute low-value token having been generated by the user browser in response to the user browser being unable to obtain a low-value token from the token service.

Also included are embodiments of a system. Some embodiments of the system include a data storage device storing instructions for enabling generation of substitute low-value tokens, and a processor configured to execute the instructions to perform a method comprising providing software content to a content delivery network wherein, when transmitted to a user browser, the software content is configured to enable the user browser to create a substitute low-value token if a token service is unavailable, wherein the content delivery network is configured to provide the software content to at least one user browser, and receiving the substitute low-value token from a merchant system, the substitute low-value token having been generated by the user browser in response to the user browser being unable to obtain a low-value token from the token service.

Also included are embodiments of a computer-readable medium. Some embodiments of the computer-readable medium include a non-transitory computer-readable medium storing instructions that, when executed by a transaction processor, cause the transaction processor to perform a method for enabling generation of substitute low-value tokens, the method comprising providing software content to a content delivery network wherein, when transmitted to a user browser, the software content is configured to enable the user browser to create a substitute low-value token if a token service is unavailable, wherein the content delivery network is configured to provide the software content to at least one user browser, and receiving the substitute low-value token from a merchant system, the substitute low-value token having been generated by the user browser in response to the user browser being unable to obtain a low-value token from the token service.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and systems for generating a substitute low-value token corresponding to sensitive data. Such systems and methods maintain increased security for electronic transactions while still enabling merchants and other transacting parties to transact in the event that a token provider is unavailable.

It should be appreciated that particular consideration is made herein to credit card transactions due to the prevalence of these transactions. Despite this reference to credit cards, the disclosed systems and methods apply equally well to the transfer of any sensitive data, whether "card present" or "card not present" (CNP). Disclosed systems and methods may apply, for example, in online transactions in which a user is not physically present at a merchant location. Transactions may include debit transactions, gift card transactions, PayPal™ transactions, BitCoin™ transactions, smart card transactions, mobile application transactions, and the usage of loyalty cards, to name a few. Systems and methods disclosed herein may be employed in effectively any circumstance in which sensitive data, such as a personal account number (PAN), social security number, etc., or token corresponding thereto, is being transmitted over a network. Further, while the party seeking to initiate a secure transaction may be referred to herein as a "merchant," a party seeking to initiate a secure transaction need not be a merchant, and may instead be a service provider, or any party seeking to execute a transaction.

Figure 1:
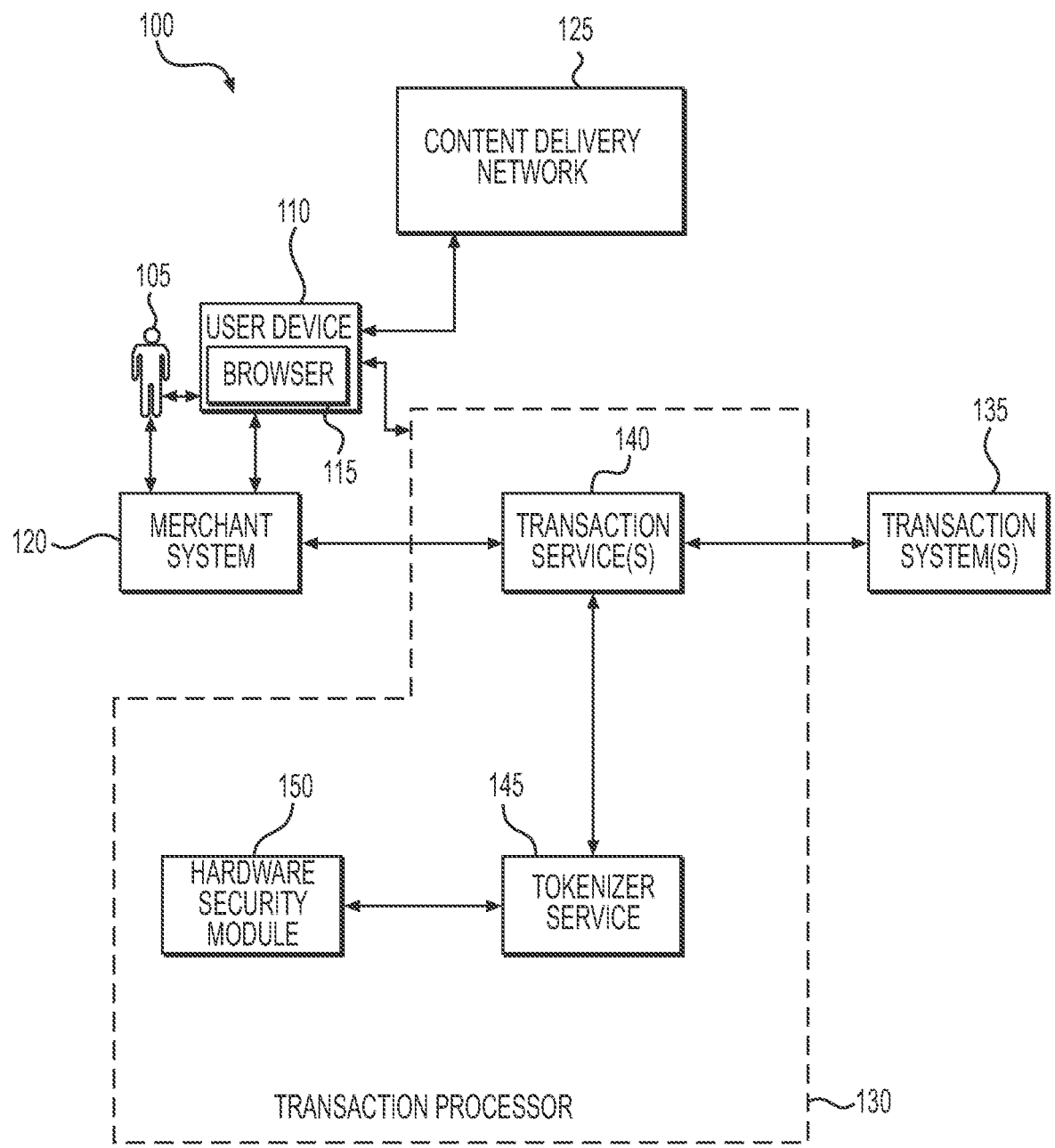
FIG. 1 is an example schematic block diagram of an environment and system for tokenization, according to techniques presented herein.

FIG. 1 generally depicts an environment 100 in which a user 105 employs a user device 110 to transact with a merchant system 120. FIG. 1 also depicts a content delivery system 125, a transaction system 135, and a transaction processor 130 comprising a transaction service 140, a hardware security module 150, and a tokenizer service 145. In general, user 105 may use user device 110 to make a purchase with merchant system 120, such as with a browser 115, which in turn communicates with transaction processor 130 to complete a purchase transaction.

Merchant system 120 may be any type of online sales or merchant point of sale ("POS") system(s), terminal(s), and/or server that may collect credit card information (or other sensitive data) and transfer the data securely to transaction system(s) 135, which may be a payment system(s), via an intermediary such as transaction processor 130. User 105 may provide sensitive data directly, such as at a POS terminal at a retail location, or remotely, for example, via user browser 115. The user browser 115 may interact with the merchant system 120, and/or directly with the transaction processor 130. The user browser 115 may be a client-side browser on a user computing device, but may also be a client-side app, or any other type of client-side data processor. The merchant system 120 may be a payment terminal (e.g., a "pin pad") or a data server, for example, displaying a merchant's e-commerce store. The user browser 115 may interact with content delivery network 125 (CDN) to request and obtain content. The CDN may act as a proxy content provider, and may be highly-available and high-speed. The CDN may provide content, such as software, scripts, or other content to enable one or more transactions to occur. For example, the CDN may provide an app that enables the user 105 to initiate a secured transaction. The CDN may provide browser code, such as JavaScript, which may enable the user browser to perform one or more aspects of a secured transaction. The CDN may also operate within the transaction processor 130.

A transaction processor 130, such as a payment processor, may be an intermediary in this system to ensure validity of the request, and may generate a token. The token may be, for example, a randomly generated number. The token may also be a pseudorandom number, encrypted information, or other character sequence. The transaction system(s) 135 may securely return a transaction response to merchant system 120, along with the token generated by the transaction processor and/or transaction system 135.

By relying upon a token, a merchant system 120 is no longer required to send credit card information or other sensitive data for subsequent transactions, and may instead use the token, such as for follow-up activities. For example, a restaurant may initially run a transaction for the cost of a meal, and perform a follow-up transaction using the token for processing the tip. Alternatively, in a card-not-present context, an online merchant may run multiple transactions for a recurring web subscription using one or more tokens. Another example may include recurring transactions for a gym membership. A merchant may use tokens for returns or price adjustments rather than resending sensitive transaction information over a network. Using tokenization, a merchant or retailer may enhance security by not storing sensitive data of customers on its own systems. However, as will be discussed further below, this may create problems, as merchants may require sensitive data to perform their services.

As an example, a user 105, such as a customer or purchaser, may interact with merchant system 120 and/or user browser 115 to initiate a transaction, such as to pay for a good or service. In a physical environment, the user 105 may provide a magnetically stored account number and/or expiration number in the form of a credit card, but any form of sensitive data may be used, in some embodiments. In the e-commerce environment, the user 105 may type the credit card account number and expiration date into the user's computing device, for example in the user browser 115.

The merchant system 120 may include a fixed card reader, an integrated cash register system, a mobile payment application, a consumer's computer, or the like. As noted above, merchant system 120 may encrypt the collected data at the reader head or processor in order to ensure security. Alternatively, the initial encryption may be performed in software in the merchant system 120, in some embodiments. Encryption may also occur at the user browser 115. Software encryption, however, may increase vulnerability to security breach if merchant system 120 has been compromised. Regardless of location of initial encryption, an encryption protocol may be employed, in some embodiments. This encryption protocol may include a merchant ID, an amount for the transaction, a password(s) and/or an encrypted portion(s), or other transaction metadata. In some embodiments, the encrypted portion may be in the following format:

```
<encryption>
<block>
<key>
<serial number>
</encryption>
```

It should be appreciated that, while a specific encryption protocol is presented here, alternate known encryption schemas may be readily employed in alternate embodiments.

In one embodiment, the merchant system 120 and/or user browser 115 may provide the collected account information (and/or other sensitive data) to a transaction service(s) 140, such as payment or tokenization service(s) of transaction processor 130 (e.g., payment management system or payment processor). This transfer of data may be performed over a telecommunications network, for example, the Internet, or via any other type of network. Transaction service(s) 140 may include a plurality of systems for receiving the data, dependent upon transmission mechanism and data type, as will be discussed in greater detail below. The transaction service(s) 140 may perform an initial check for encryption of the data. If the received data is not encrypted, the received data may be transferred promptly to transaction system(s) 135 for transfer of funds, or directly to entities such as Visa, MasterCard, etc. Transaction system(s) 135 may be operated by entities, such as Global Card Bank, for example. However, where encryption is present, and/or tokenization is desired, transaction service(s) 140 may transfer the information to a tokenizer service 145 for processing. Transaction service(s) 140 may validate the encrypted block, encrypted key, and/or reader serial number lengths. It may also validate a merchant ID with a stored database of terminal IDs.

Tokenizer service 145 may further validate credentials and identify keys for the encrypted data. The data may further be submitted to a hardware security module 150 for decryption and for the generation of a token. The token may include a PAN, an expiration date for the token, and/or an expiration date for the card. Tokens might also not contain any sensitive data, but rather merely correspond to sensitive identification data such as social security numbers, account information, or other sensitive financial data, such as cardholder data. The sensitive data may be stored securely at the transaction processor 130 or elsewhere.

In some embodiments, any expiration date of the token, if present, may be varied depending upon whether the token is designated as a single use token or as a token for recurring transactions (e.g., a subscription). For example, a one-year and two-year expiration may be provided for single use and recurring tokens, respectively, which may allow for a longer validity period where the merchant is anticipating reuse of the token, and may ensure that single use tokens are not stored longer than necessary.

The token, which may be encrypted, and clear text of the data supplied by merchant system 120, may be returned to tokenizer service 145 and subsequently to transaction service(s) 140. Transaction service(s) 140 may transfer the clear text to transaction system(s) 135 for a transaction response. The response may then be provided, along with the token, back to the merchant, such as to the merchant system 120. The merchant may then store the encrypted token for later transactions. Alternatively, the token may be provided to the user browser 115, which may use the token to perform a transaction, such as an online transaction.

Thus, the merchant may be prevented from accessing sensitive data without keys that may be maintained within hardware security module 150, or elsewhere in a secured location accessible to the transaction processor 130. Thus, for account information to be compromised, both the merchant system 120, or user browser 115, and the transaction processor 130 would need to be breached. Alternatively, sensitive data may be stored exclusively within the transaction processor 130.

Figure 2:
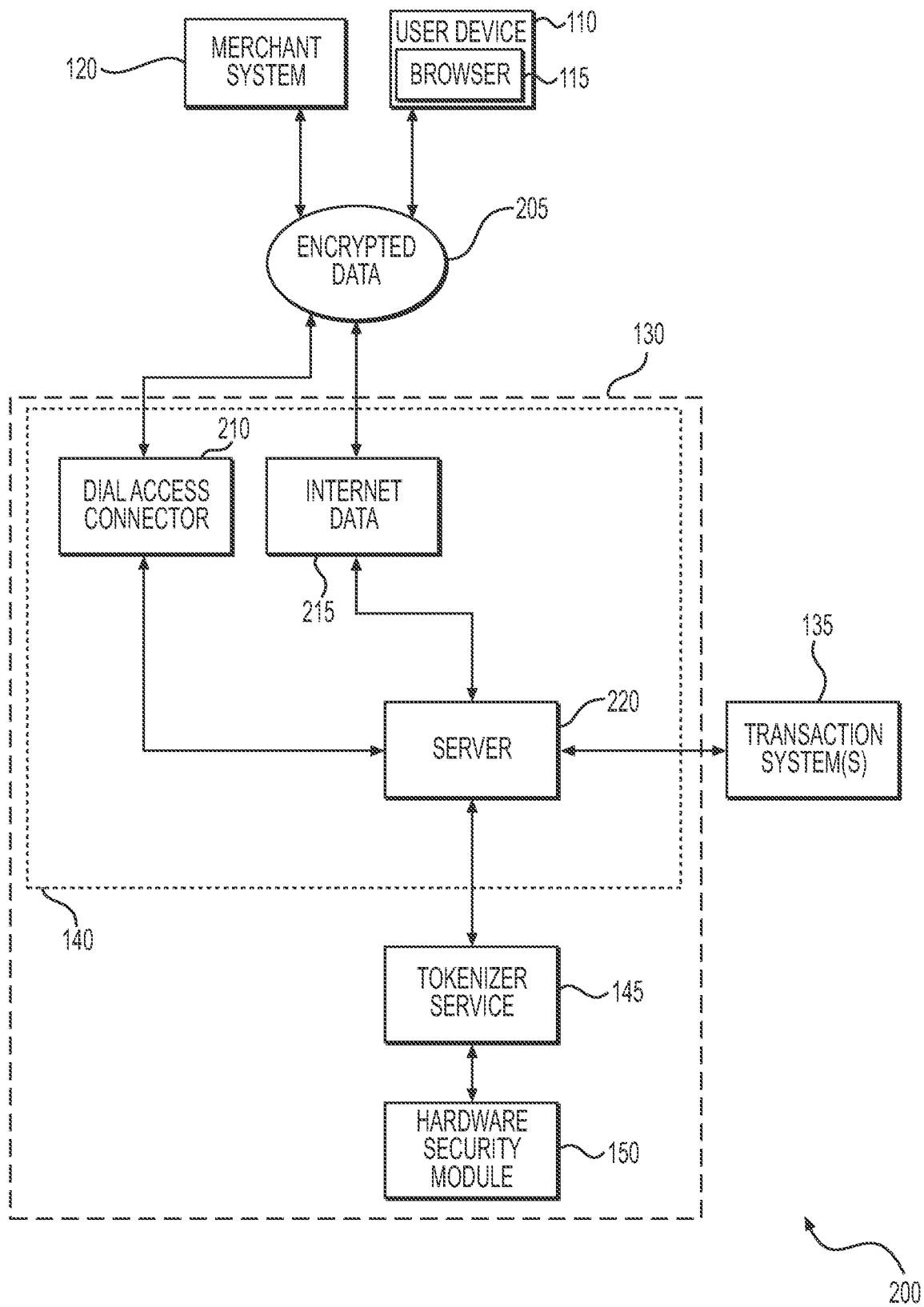
FIG. 2 is an example schematic block diagram of components within the tokenization system and transaction processor of FIG. 1, in accordance with some embodiments.

FIG. 2 is an example schematic block diagram of components within the tokenization system and transaction processor 130, in accordance with some embodiments. In this example block diagram, unencrypted data or encrypted data 205 from merchant system 120 and/or user browser 115 may be delivered to transaction processor 130, such as to transaction service(s) 140, via, for example, a dial-up access connector 210, or Internet data connection 215, through which data may pass, for example, via a network socket and/or web service. Although a dial-up access connector 210 and Internet data 215 connections are shown, any type of data connection may be established for data transfer purposes. Incoming data may be provided to server 220.

In addition to the server 220, other servers may be included, in alternate embodiments, in order to handle any data inputs. For example, in embodiments where gift cards or loyalty cards are being processed, the system may include a gift card server or loyalty card server. The system may be scalable to take any number of payment types, as is desirable based on the scenario.

The server 220 may determine whether a token is present and/or if data is encrypted. If the data is not encrypted and the merchant is not set up for tokenization, the clear text data may be transferred to the transaction system(s) 135 (such as Global Card Bank, Visa, etc.) for approval or declining. Otherwise, if the data includes a token or encrypted data, or if tokenization is otherwise requested, the data may be provided to tokenizer service 145, as previously discussed.

Although the transaction service 140, hardware security module 150 and tokenizer service 145 are depicted as separate entities within the transaction processor 130, the services provided by each of these entities may be incorporated into each other in any manner. For example, the features of the hardware security module 150 and tokenizer service 145 may be incorporated into the server 220 within the transaction service 140.

Figure 3:
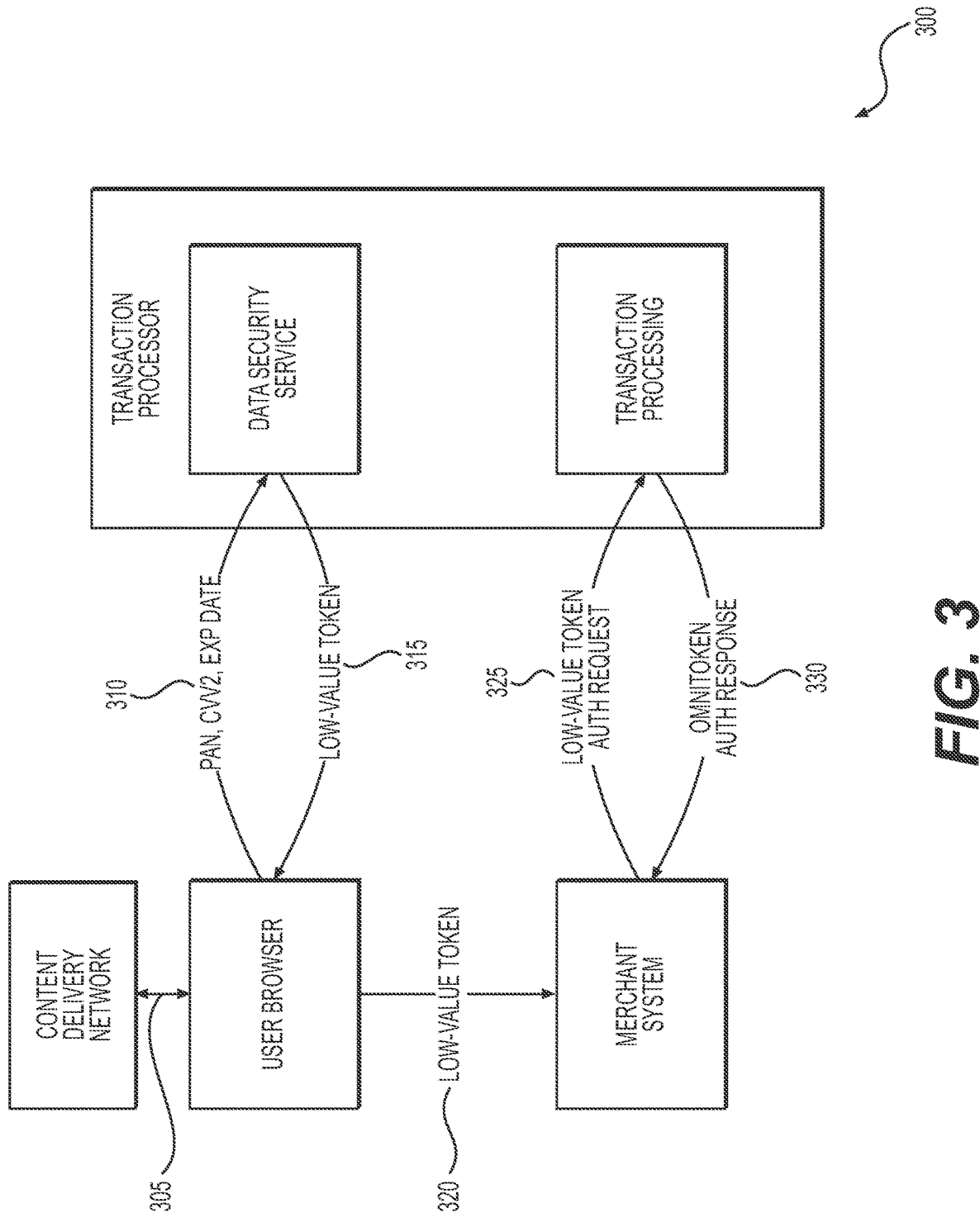
FIG. 3 is a block diagram illustrating a method of performing a transaction using a low-value token, according to techniques presented herein.

FIG. 3 is a block diagram illustrating a system 300 performing an online transaction utilizing tokens where a user 105 may initiate a card-not-present (CNP) transaction using, for example, a browser 115 that requests a low-value token from the transaction processor 130. As described above, security risks for both the customer and the merchant may be particularly high in a CNP scenario. If merchants were to store sensitive data of customers, for example, they would be exposing themselves to legal liability in the event of a security breach. One solution to this problem is to prevent the merchant from ever obtaining the sensitive data at all.

In a CNP transaction, at step 305 a user 105 may receive, in a browser 115, content from CDN 125. For example, the browser may load scripts or other software from the CDN 125, which may partly or entirely enable the browser to initiate a transaction with the transaction processor 130. Alternatively, content from CDN 125 might only be sought or received by the user browser 115 in the event of an outage at the transaction processor 130.

At step 310, the sensitive data may be transferred to the transaction processor 130. The sensitive data may include sensitive data, such as, but not limited to, a personal account number (PAN), a card verification value (CVV), and/or an expiration date of the card, for example, in order to execute an online purchase. This information may be entered in a web form that appears to the user to be owned by the merchant, but the form may actually be hosted by transaction processor 130 via, for example, an iFrame. A server such as a data security service, which may be server 220 or transaction services 140, may receive the sensitive data, which may be encrypted, and may act as a token service to provide a low-value token back to the user browser 115 at step 315. The low-value token may be a randomly generated, non-sensitive, registration identifier that acts as a replacement for the PAN and/or other sensitive data.

A low-value token may be generated dynamically, and may have a unique value for each transaction, even if the same PAN is presented for tokenization multiple times. Low-value tokens may utilize additional compensating controls such that the token applies only to specific transactions and processing environments. A transaction-based token value may be requested through a low-trust environment over the Internet. The token value might only be valid for 24-hours, or some other pre-determined period of time, after which it can no longer be used for payment processing.

Other compensating controls may be utilized. For example, third parties may be authenticated in order to be able to detokenize with the transaction processor 130. An authentication of merchant high-value token to low-value token may be performed via an existing message interface specification. The third party may be validated as a trusted requestor to call the transaction processor 130 to detokenize for every transaction.

Token group controls may also be utilized, for example in order to ensure that the detokenization is being performed for the right merchant. A token group may be identified by a merchant. As third parties may support multiple merchants, controls may be taken to ensure that a third party does not detokenize a low-value token under the wrong merchant token group. For example, the third party may provide an additional merchant identifier to ensure the associated merchant is correct.

Transaction controls may also be utilized, for example in order to restrict the types of transactions third parties can perform. Third parties may only be able to perform detokenization operations with a low-value token and not be able to detokenize with a high-value token (omnitoken), or retokenize, etc. Third parties may be able to perform tokenization of the PAN to a low-value token to provide to the retailer. Operations may also be able to be performed in several ways. Operations may be able to be performed directly to the transaction processor 130 platform using a message specification. A non-financial interface may also be used for batch processing.

At step 320, the low-value token may be provided from user browser 115 to the merchant system 120, such as an e-commerce server. The merchant's system may provide the low-value token to a transaction-processing unit at step 325, which may be, for example, server 220 or transaction services 140. The transaction processor 130 may convert the low-value token to a high-value token or "omnitoken authorization response" at step 330, which may be provided back to the merchant's system 120. The high-value token may be reused by the merchant for subsequent transactions, as discussed above. While transaction processing and at least one data security service are depicted as sending and receiving data, any entity in the transaction processor may perform the steps depicted in FIG. 3, including server 220 or transaction services 140.

Using systems and methods such as those of FIG. 3, sensitive data such as cardholder data might not ever be transmitted to the merchant's servers, because the webpage displayed in the user browser at step 305, or a portion thereof, may be hosted by the transaction processor 130.

As discussed above, a problem arises if the data security service is unavailable. In this scenario, the user browser may be unable to obtain a low-value token. As a result, the transaction may be delayed, or canceled entirely. The merchant might also conduct the transaction without tokenization, which is a security risk. A solution is needed that will build value, preserve risk reduction, enable a cost-effective architecture, and that does not dilute the original value proposition.

Figure 4:
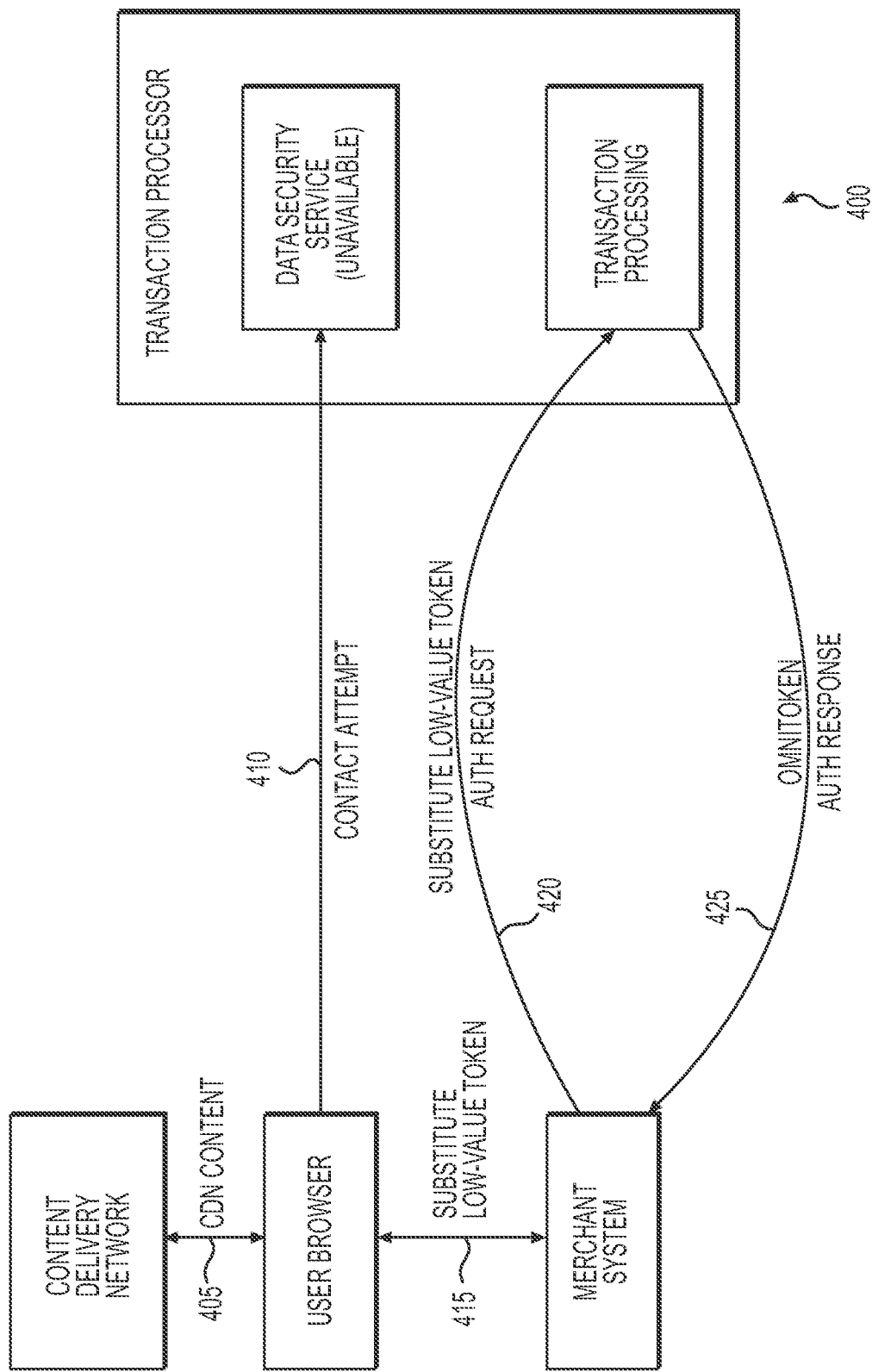
FIG. 4 is a block diagram illustrating a method of generating a substitute low-value token, according to techniques presented herein.

FIG. 4 is a block diagram of a system 400 illustrating a method of generating a substitute low-value token so that the user 105 may conduct transactions in the event that the data security service or other entity at the transaction processor 130 is unavailable, according to certain embodiments presented herein.

At step 405, the user browser 115 may receive content from the CDN 125. The content may comprise data, such as software code, an application, script, etc. The content may enable the browser to, or the browser may by itself, attempt to contact the data security service at the transaction processor 130, at step 410. In another embodiment, the user browser might only establish a connection with the CDN if one or more services at the transaction processor 130 is unavailable. In another embodiment, the user browser 115 may receive a first portion of software code from the CDN 125, and then attempt to contact the transaction processor 130, or an entity therein, such as the data security service. If one or more services of the transaction processor 130 is at least partially unavailable, the user browser 115 may receive a second portion of software code from the CDN 125. The CDN providing the first portion of software need not be the same entity as the CDN providing the second portion of software. In another embodiment, the CDN 125 may be a service operating within or associated with the transaction processor 130.

As discussed above, in one embodiment, upon determining that the data security service is unavailable, the user browser may utilize content provided by the content delivery network to generate a substitute low-value token. The user browser may establish a connection with the CDN to obtain content sufficient to generate a substitute low-value token, or may utilize content that the browser may have already obtained from the CDN in step 405.

At step 415, the user browser 115 may generate a substitute low-value token, and may provide it to the merchant system 120. Rather than being an entirely randomly generated number, the substitute low-value token may contain encrypted sensitive data that was encrypted using a public key provided by the transaction processor 130 at some prior point in time. The public key may have been generated using asymmetric cryptography, and may have a corresponding private key stored at or for the transaction processor 130. The public key may be provided in software, such as a script, from the CDN, or may be provided by transaction processor 130. For example, the PAN and expiration date, or other cardholder data, may be encrypted and placed within the substitute low-value token. The merchant system may receive the substitute low-value token, but may be unaware that the low-value token is a substitute, or that the substitute low-value token contains any sensitive data. The merchant system may provide the substitute low-value token along with an authorization request to the transaction processor 130 according to its normal procedure at step 420, and may receive an authorization response and/or high-value token at step 425.

Figure 5:
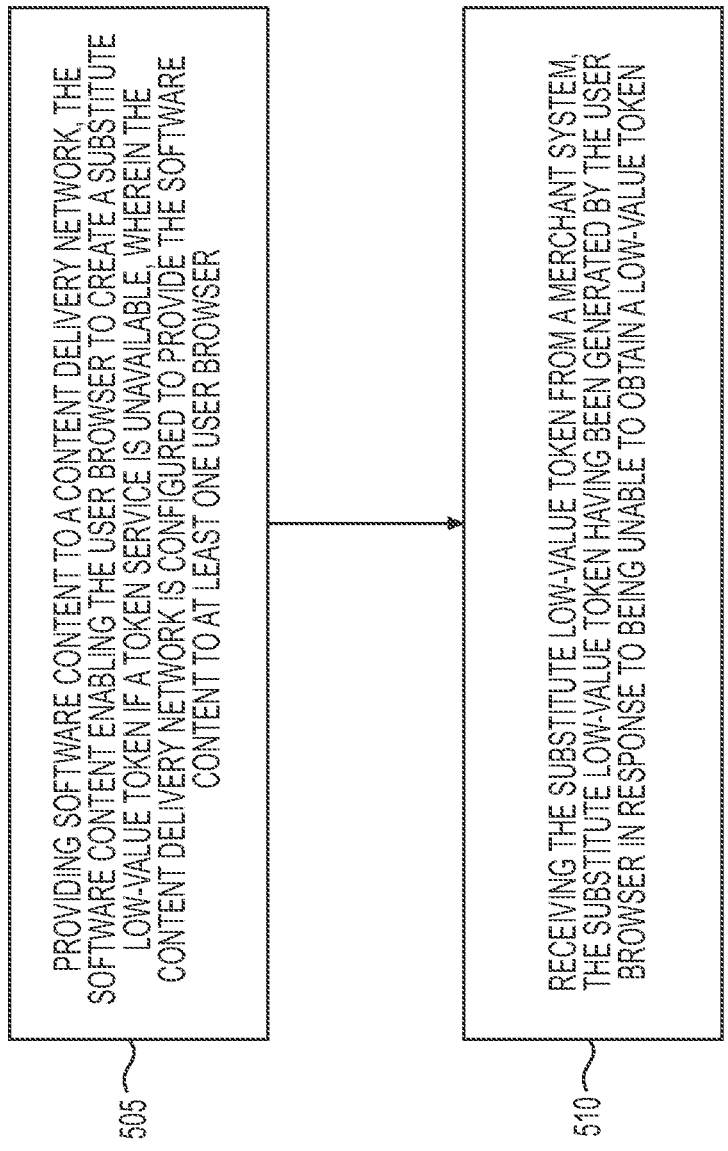
FIG. 5 is a block diagram illustrating a method of performing a transaction using a substitute low-value token, according to techniques presented herein.

FIG. 5 is a flow diagram illustrating a method of performing a transaction using a substitute low-value token when at least one portion of transaction processor is unavailable, according to techniques presented herein. At step 505, software content may be provided to a content delivery network, wherein the content delivery network provides the software content to at least one user browser, the software content enabling the user browser to create a substitute low-value token. A contact attempt may be received from the user browser, the user browser attempting to obtain a low-value token. At step 510, the substitute low-value token may be received from a merchant system, the substitute low-value token having been generated by the user browser in response to being unable to obtain a low-value token.

Techniques presented herein improve the technical field by, for example, enabling a merchant to comply with the Payment Card Industry Data Security Standard (PCI DSS) in a manner that builds value, preserves risk reduction, enables a cost-effective architecture, and that does not dilute the original value proposition. This allows merchants to continue processing transactions in a highly secured tokenization scenario, all the while unaware that some low-value tokens may contain encrypted sensitive data. A further advantage is that a network fail-safe is added to ensure continued functioning at a high level of security despite partial network outage. The field of tokenization and network security is improved, thus limiting the potential of a security breach. Further, techniques presented herein solve a problem arising in the post-Internet era, namely, for example, an electronic merchant needing to continue processing secure transactions despite a partial network outage.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

In addition, embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the present disclosure has been described in terms of several embodiments, there are alterations, modifications, permutations, and substitute equivalents, that fall within the scope of this disclosure.

It should also be noted that there are many alternative ways of implementing the methods and systems of the present disclosure. It is therefore intended that the following appended claims be interpreted as including all such alterations, modifications, permutations, and substitute equivalents as fall within the true spirit and scope of the present disclosure.

What is claimed is:

1. A computer-implemented method of generating a substitute low-value token, comprising:
   receiving, by a user device, a first portion of software code from a content delivery network;
   receiving, by a user browser of the user device, information associated with an electronic transaction;
   determining, by the user browser of the user device, that a tokenization service is unavailable;
   receiving, by the user device, a second portion of the software code from the content delivery network, based on determining that the tokenization service is unavailable;
   generating, by the user browser of the user device, a substitute low-value token using the first portion of the software code and the second portion of the software code; and
   transmitting, by the user browser of the user device, the substitute low-value token to a merchant system.

2. The method of claim 1, wherein the substitute low-value token is transmitted with a request to authorize the electronic transaction.

3. The method of claim 1, wherein the substitute low-value token comprises encrypted cardholder data.

4. The method of claim 1, wherein the first portion of the software code or the second portion of the software code comprises a public key.

5. The method of claim 1, wherein the second portion of the software code is provided to the user browser in response to the user browser being unable to obtain a low-value token.

6. A system for generating a substitute low-value token, the system comprising:
   a data storage device storing computer-executable instructions that, when executed by at least one processor, causes the at least one processor to perform operations of:
   receiving, by a user device, a first portion of software code from a content delivery network;
   receiving, by a user browser of the user device, information associated with an electronic transaction;
   determining, by the user browser of the user device, that a tokenization service is unavailable;
   receiving, by the user device, a second portion of software code from the content delivery network, based on determining that the tokenization service is unavailable;
   generating, by the user browser of the user device, the substitute low-value token using the first portion of the software code and the second portion of the software code; and
   transmitting, by the user browser of the user device, the substitute low-value token to a merchant system.

7. The system of claim 6, wherein the substitute low-value token is transmitted with a request to authorize the electronic transaction.

8. The system of claim 6, wherein the substitute low-value token comprises encrypted cardholder data.

9. The system of claim 6, wherein the first portion of the software code or the second portion of the software code comprises a public key.

10. The system of claim 6, wherein the second portion of the software code is provided to the user browser in response to the user browser being unable to obtain a low-value token.

11. A non-transitory computer-readable medium storing computer-executable instructions that, when executed by at least one processor, cause the at least one processor to perform operations for generating a substitute low-value token, the operations comprising:
- receiving, by a user device, a first portion of software code from a first content delivery network;
- receiving, by a user browser of the user device, information associated with an electronic transaction;
- determining, by the user browser of the user device, that a tokenization service is unavailable;
- receiving, by the user device, a second portion of the software code from a second content delivery network, based on determining that the tokenization service is unavailable;
- generating, by the user browser of the user device, the substitute low-value token using the first portion of the software code and the second portion of the software code; and
- transmitting, by the user browser of the user device, the substitute low-value token to a merchant system.

12. The computer-readable medium of claim 11, wherein the substitute low-value token is transmitted with a request to authorize the electronic transaction.

13. The computer-readable medium of claim 11, wherein the substitute low-value token comprises encrypted cardholder data.

14. The computer-readable medium of claim 11, wherein the software content comprises a public key.

15. The computer-readable medium of claim 11, wherein the first portion of the software code or the second portion of the software code comprises a public key.

16. The computer-readable medium of claim 11, wherein the first content delivery network and the second content delivery network are the same entity.

17. The computer-readable medium of claim 11, wherein the first content delivery network and the second content delivery network are different entities.

18. The computer-readable medium of claim 11, wherein at least one of the first content delivery network or the second content delivery network is a data security service operating in connection with a transaction processor.

19. The computer-readable medium of claim 11, wherein the tokenization service is provided by a transaction processor remote from the user device.

20. The computer-readable medium of claim 11, wherein the substitute low-value token transmitted to the merchant system is subsequently exchanged with a primary token.

* * * * *